US009015262B2

(12) United States Patent
Luber

(10) Patent No.: US 9,015,262 B2
(45) Date of Patent: Apr. 21, 2015

(54) POSTHUMOUS MESSAGE DELIVERY SYSTEM

(71) Applicant: Del E. Luber, Fenton, MO (US)

(72) Inventor: Del E. Luber, Fenton, MO (US)

(*) Notice: Subject to any disclaimer, the term of this patent is extended or adjusted under 35 U.S.C. 154(b) by 0 days.

(21) Appl. No.: 13/887,952

(22) Filed: May 6, 2013

(65) Prior Publication Data

US 2013/0297710 A1    Nov. 7, 2013

Related U.S. Application Data

(60) Provisional application No. 61/642,528, filed on May 4, 2012.

(51) Int. Cl.
*H04L 12/58*    (2006.01)
(52) U.S. Cl.
CPC ............ *H04L 51/02* (2013.01); *H04L 12/58* (2013.01); *H04L 51/14* (2013.01)
(58) Field of Classification Search
CPC ......... H04L 51/02; H04L 51/14; H04L 12/58; H04L 51/00; H04L 51/046; H04L 51/08; H04L 51/10; H04L 51/32; H04L 51/36; H04L 51/38
USPC ......................................................... 709/206
See application file for complete search history.

(56) References Cited

U.S. PATENT DOCUMENTS

| | | | |
|---|---|---|---|
| 5,983,200 A | 11/1999 | Slotznick | |
| 6,324,650 B1 | 11/2001 | Ogilvie | |
| 6,947,921 B2 | 9/2005 | Notargiacomo | |
| 2002/0072925 A1 | 6/2002 | Krim | |
| 2002/0111946 A1 | 8/2002 | Fallon | |
| 2003/0217120 A1 | 11/2003 | Hickey | |
| 2005/0015710 A1 | 1/2005 | Williams | |
| 2006/0029199 A1 | 2/2006 | Osterer | |
| 2007/0061471 A1 | 3/2007 | Glover | |
| 2008/0255988 A1 | 10/2008 | Maltese | |
| 2009/0265382 A1 | 10/2009 | Freiman et al. | |
| 2010/0307037 A1 | 12/2010 | Chi | |
| 2011/0082817 A1 | 4/2011 | Vandervort Stiles | |

(Continued)

OTHER PUBLICATIONS

Doing It for Me—Don't Be Shy Blog [online], Dee Thomas, publication date unknown [retrieved on May 3, 2013]. Retrieved from the Internet <URL: http://www.doingitforme.com/>.

(Continued)

*Primary Examiner* — Kostas Kitsikis
(74) *Attorney, Agent, or Firm* — CreatiVenture Law, LLC; Dennis J M Donahue, III

(57) ABSTRACT

A posthumous message delivery system provides an online means to leave messages after death. The system utilizes inspirations to help the user prepare messages for each of the individuals on their recipient list, and the user can select from a variety of messaging platforms in which the message will be sent, including e-mail systems and social media systems, and the system automatically incorporates the inspirations into a message or selects a completed message. At the time of the user's death, the messages are authorized for release by an appointed trustee using a pin or password. The messages may be immediately released at the time of authorization or the messages may be configured for release at various milestones. The user has the capability of adding, deleting, and editing messages. Messages can be sent to groups of recipients, including social media contacts, or the messages may be limited to selected recipients.

19 Claims, 10 Drawing Sheets

(56) References Cited

U.S. PATENT DOCUMENTS

| | | | |
|---|---|---|---|
| 2011/0202615 A1* | 8/2011 | Fletcher | 709/206 |
| 2012/0005287 A1* | 1/2012 | Gadel et al. | 709/206 |
| 2012/0066613 A1* | 3/2012 | Berger | 715/751 |
| 2012/0303390 A1* | 11/2012 | Brook et al. | 705/4 |
| 2013/0159445 A1* | 6/2013 | Zonka et al. | 709/206 |

OTHER PUBLICATIONS

I Had Cancer Website—Squeaky Wheel Media Inc. [online], Mailet Lopez, publication date unknown [retrieved on Jun. 28, 2014]. Retrieved from the Internet <URL: http://www.ihadcancer.com/>.

What Matters Now Website—The Samvara Project [online], publication date unknown [retrieved on Jun. 28, 2014]. Retrieved from the Internet <URL: http://www.whatmattersnow.org/>.

* cited by examiner

FAREWELL for NOW ...Respond now for them to cherish later

HOME | HOW IT WORKS | WHY FAREWELL FOR NOW | CONTACT | PURCHASE/REDEEM | LOGIN

Individual Memberships

The benefits of your individual membership include:

- Unlimited messages and recipients
- Full access to over 100 "inspirations"
- Up to 2 GB of storage for image & videos
- No monthly or annual fees! One payment for a lifetime membership

Pricing

Farewell for Now offers individual and Group options as well as the ability to buy a membership as a gift. You have the opportunity to purchase either a single membership or multiple memberships at discounted prices. Corporate Memberships and gift memberships are also available.

It's about appreciating where you've been, and ultimately embracing the end.
It's about *saying good-bye*, or saying hello.
It's *about* building a bridge or destroying one.
It's about reaching out, taking the high road or getting the last word.
It's about *re-establishing* or completely extinguishing.
It's about life, and your response to it.

Group or Gift Memberships

The benefits of your group membership include:

- Same benefits as the individual membership PLUS
- Pricing discounts for group/gift Memberships
- Easy administration of access codes

| | |
|---|---|
| 1-10 Memberships | $###.## Per Member |
| 11 or more Memberships | $###.## Per Member |

Register Today & Begin Your Journey

Regardless, it's a Journey and it's Affirming. We'll help you get there.

Corporate Memberships

The benefits of your corporate purchase include:

- Same benefits as the individual membership PLUS
- Special Pricing Options
- Easy administration of access codes
- Enhanced employee/customer goodwill
- Recognition on our Partners Page © 2012 Farewell for Now, LLC. All Rights Reserved. Patent Pending.     TERMS & CONDITIONS     CORPORATE INTEREST     PRIVACY

Inspiration Categories

Select a category listed below to browse the inspirations & help you get started.

[▶] Start Writing a Message

| | |
|---|---|
| Affirming | Inspiring/Religious |
| Agitated | Leaving for College |
| All | Loving |
| Angry | Military |
| Awkward | No Way |
| Bold | Proclamation/Life's Statement |
| Children | Provocative |
| Edgy/Irreverent | Reconciliation |
| Encouragement | Regrets/No Regrets |
| Ex's | Risky |
| Finality | Sad |
| Funny/Lighthearted | Surprise |
| Grinding an Axe | The best of? |
| Health Issues | What Could /Should Have Been |

FIG. 6A

Messages > Inspirations Listing > All

Click the checkboxes below to select one or more inspirations & click the icon button for the application/service you want to use with the inspiration. Our system launches the application/service and either automatically populates the message field with the selected inspiration(s) or automatically selects the e-card or other gift that you purchase from partnering stores using your account.

- [▶] Write a Message
- [▶] Record a Message
- [🎁] Buy an e-card with this message
- [a⭑] Order a gift that has this message
- [f t in g ✉] Share this inspiration other ways ☐ If life has taught me anything ...
☐ In another time and place, we ...
☐ You were a good man ...
☐ I'm ready ...
☐ I've never been as proud as when ...
☐ You need to forge ahead with ...
☐ If your Dad/Mom were alive today, ...
☐ Your presence in my life meant ...
☐ You were right about ...
☐ You were wrong about ...
☐ I know this will be hard for you to read ...

↓ Many More...

FIG. 6B

POSTHUMOUS MESSAGE DELIVERY SYSTEM

CROSS-REFERENCE TO RELATED APPLICATIONS

This application claims priority from U.S. Provisional Patent Application No. 61/642,528 filed on May 4, 2012 which is hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a messaging system, and more particularly to a posthumous messaging system.

2. Related Art

Often a person facing death and/or preparing for their death wishes to leave messages for those who survive them. This is commonly done through video messages that may be viewed during a funeral service and/or at the reading of the individual's last will and testament. Currently, there are some websites that provide services for leaving messages to a deceased's survivors. Some of these websites are utilized to merely leave photos and videos that may be uploaded to the site. Other sites provide an opportunity for the user to share stories regarding their lives. At least one website provides a forum for victims of cancer to share their stories regarding their disease. After death, these stories remain on the website for others to read. Some websites provide a means to leave personal messages to specific individuals. Such websites may also be used to supplement a last will and testament and/or to organize a person's final affairs.

Unfortunately, many of these websites do not allow the user to appoint a trustee who is responsible for the release of messages and information on the site after the person's death. Rather, these websites are reliant on any particular survivor for providing notice of the user's death. As a result, the notice may not be provided and the messages are never sent. Additionally, the notice may be inadvertently provided, thereby authorizing the release of information and messages before the user's death. Some websites do not require any notice of the user's death, but rather, send emails during the user's life indicating to other's that a message will be available upon the user's death. Accordingly, these emails may be ignored and/or forgotten by the time of the user's death. As a result, the messages may never be received. At least one website operates using a set time period for release of the messages. If the user does not log in to the website within the set time period, the user is assumed dead and the messages are automatically generated. As such, inadvertent death messages may be sent during the user's life. A need remains for a posthumous or other time capsule messaging system that requires the authorization of a trustee to release messages, information, and/or documents.

Another downfall to existing messaging systems is that they do not provide catalysts for inspiration of the messages. Often, when an individual is sick and nearing death, they may not recall much of their lives and, therefore, have difficulty preparing messages to leave at the time of their death. As a result, the individual may not properly express their feelings, resulting in dissatisfaction with their messages. Another need remains for a messaging system that provides inspiration so that the user is capable of fully expressing their feelings shortly before their death.

Moreover, existing messaging services merely send messages at the time of the individual's death. However, some people may wish to leave messages that are delivered at particular milestones. For example, a grandparent may wish to leave messages for their grandchildren on the grandchild's birthday or a user may wish to offer congratulations to a family member on an upcoming graduation day. As another example, a spouse may desire for their husband or wife to receive a message each year on their wedding anniversary. Current messaging systems are not capable of sending milestones messages well into the future.

Additionally, current messaging systems are only offered to individuals. Accordingly, the messages must be recorded and uploaded to the website at a time when an individual is relatively healthy and has access to a computer. Existing systems do not allow corporate accounts, for example, hospital accounts. At the present time, individuals who have become bed-ridden within a hospital or healthcare setting do not have access to a computer to record their final statements to loved ones.

Prior art systems include the use of a webpage to collect the memories related to a deceased person, as described in U.S. Pat. No. 6,947,921, a posthumous communication system as described in US Pat. Pub. No. 2002/0072925 and a posthumous communication system and gifting system as described in US Pat. Pub. No. 2009/0265382. There are also systems that describe the delivery of greeting cards at some future known date, such as described in U.S. Pat. No. 5,983,200, and that describe the posthumous delivery of greeting cards, such as described in US Pat. Pub. No. 2011/0082817. However, none of these references teaches or suggests a delayed messaging system, posthumous or otherwise, which allows a user to select a message from predefined listing of message options to create a message within the delayed messaging system while also giving users the option of automatically connecting to their e-mail programs or connecting with their social media pages to post their messages or linking to particular messages and items available by electronic greeting cards or e-commerce sites which are related to the message topics that are of most interest to the user. Each one of these references are incorporated by reference.

SUMMARY OF THE INVENTION

The present invention provides an online system for leaving messages after death. The system allows for individual or group (i.e. family or corporate) pricing. On the corporate level, the system may be used within the health care industry to provide access to posthumous messaging for individuals who may be incapacitated and/or bed-ridden in a hospital or hospice setting. The messaging service of the present invention preferably includes the appointment of at least one trustee to control the release of content on the webpage. The trustee ensures the release of information at the appropriate time and thereby avoids premature messaging. A user of the present invention may store any number of message recipients. These recipients are left individual messages by the user. Alternatively, the user may also opt to leave group messages. The user may also leave media, i.e. photos, video, audio, or the like, for various recipients. At the time of the user's death, the trustee authorizes the release of messages to the various recipients. The recipients may receive the messages via email or may receive an email directing them to the user's account where the messages and media may be opened.

At least one novel feature of the present invention is the use of "inspirations". The inspirations are statements and/or phases that inspire the user's messages. As many users may be forgetful of their lives and/or otherwise incapable of writing freeform messages, the inspirations provide a means to respond to statements or questions to form the user's message. For example, a user may be inspired to write a message to their spouse based on the inspiration "my favorite place we traveled to was . . . . " Accordingly, the present invention aids the user in preparing the statements that will be shared after their death. The messages may be configured for delivery immediately upon authorization of the trustee at the time of the user's death or the statements may be delayed to mark a milestone. For example, the user may send a message to their spouse each year on their wedding anniversary.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a screenshot of a home webpage.

FIG. 4 is a screenshot of a registration webpage.

FIG. 6A is a screenshot of an inspiration category webpage.

FIG. 6B is a screenshot of an inspiration and application selection webpage.

DETAILED DESCRIPTION OF THE PREFERRED EMBODIMENTS

The following description of the preferred embodiment(s) is merely exemplary in nature and is in no way intended to limit the invention, its application, or uses.

Figure 1:
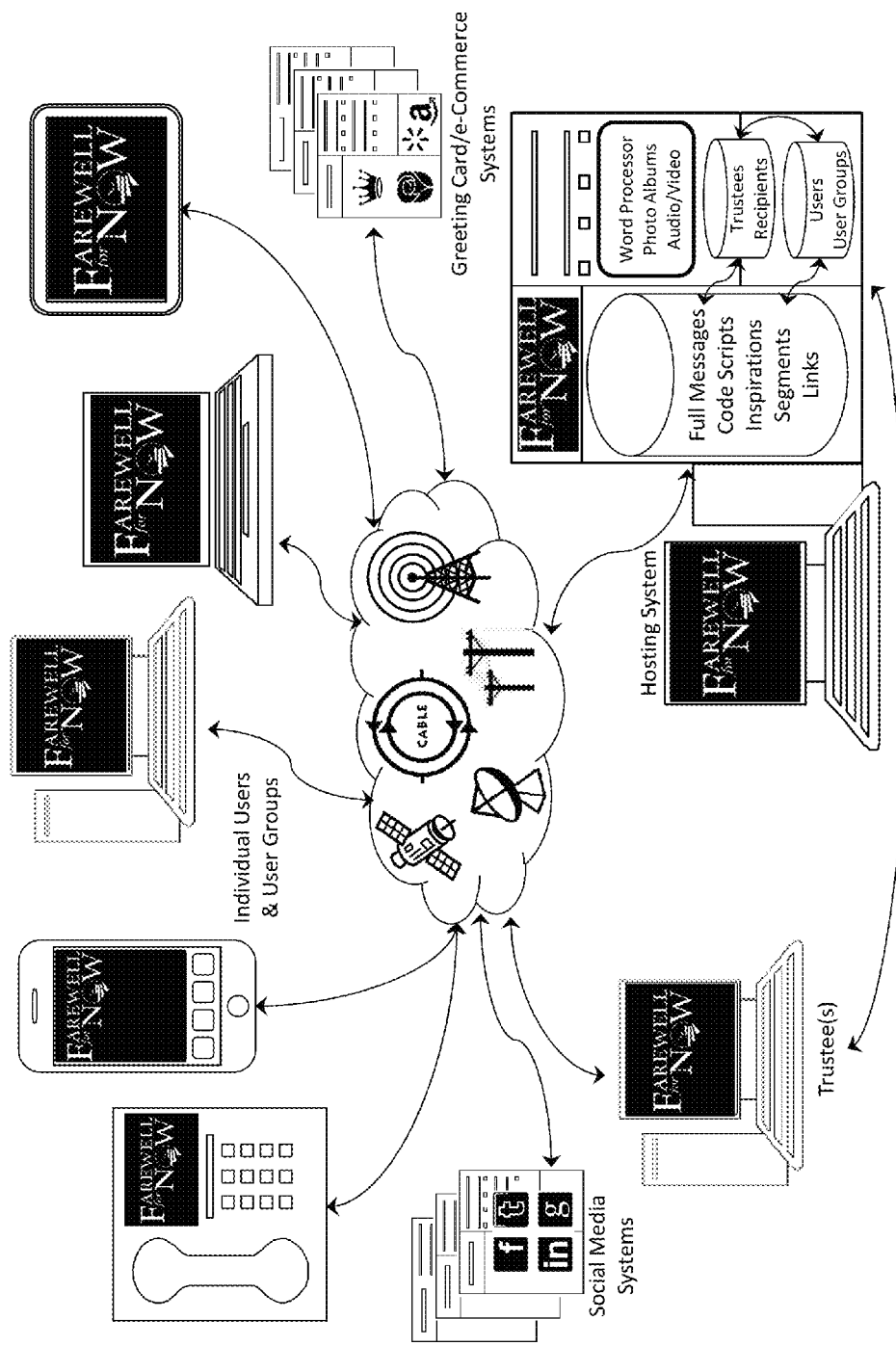
FIG. 1 is a schematic of the inventive message delivery system.

The present invention provides an online messaging system with a host computer system that guides users through the creation of their messages using inspirations, catalyst statements or other suggestions. The host system collects and preserves the messages, and then delivers the messages to the intended recipients when it is authorized to do so, such as when a trustee verifies that the author of the messages is deceased or when some other event or milestone may occur in a person's life journey. As shown in FIG. 1, the system includes a centralized computer server which has a computer processor and a database. Using a computer or mobile device, the user accesses the host system through a computer system which may be the internet or an entity's intranet. The host system is also in networked communication with the computer systems of social media services and electronic greeting card services and other e-commerce services.

Figure 2:
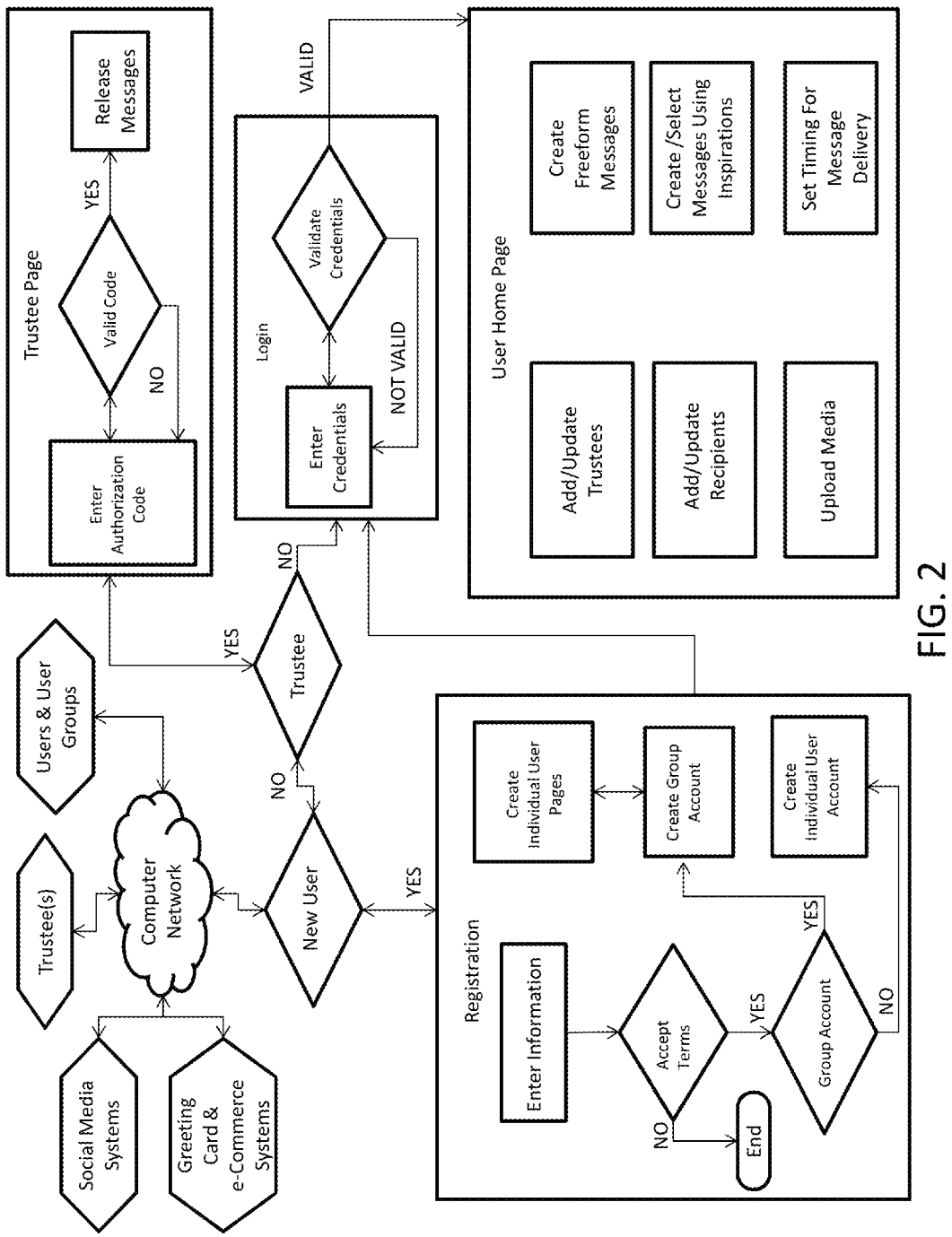
FIG. 2 is a flowchart of the message delivery system shown in FIG. 1.

As generally shown in FIG. 2, the user creates an account on the system and loads the trustee and recipient information into the system for their user profile. As shown in FIGS. 3-8, the user preferably accesses the system through a web browser application although other networked software applications could also be used for the networked communications between the user and the system. The user may then create messages and upload media for the recipients. The account information, trustee information, recipient information, messages, and media are then stored in the database which is operated by the system administrator. The information in the database can be accessed by the computer or a mobile communication device for edits and/or deletions. Additional information may also be added at any time.

As shown in FIG. 3, variable pricing options are available. One option includes pricing for a single user. Another option includes pricing for multiple users. As an example, a family may register with the online system thereby providing each family member an opportunity to prepare messages that can be placed in the user's time capsule or may be sent immediately. In another embodiment, entities may register with the messaging system. For example, the system may be available for hospital systems, life insurance companies, hospice, pharmaceutical companies, the funeral industry, the military, or the like.

Figure 10:
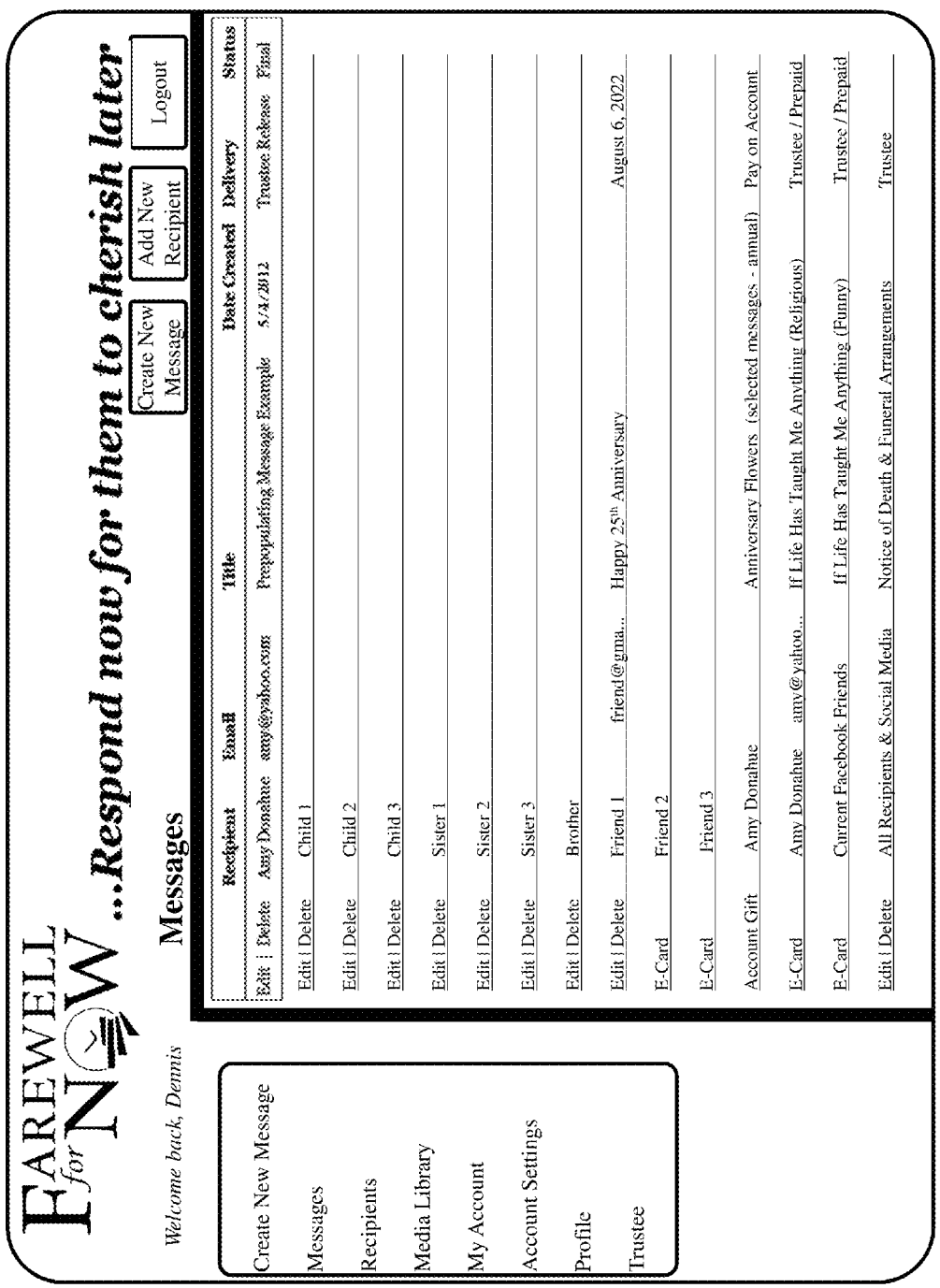
FIG. 10 is a screenshot listing messages and items stored for a system user.

While many users of the inventive system may be an individual preparing for their death and/or any individual contemplating mortality and seeking an engaging or affirming experience to reflect on their life, there are other uses of the time capsule messaging system. For example, as a bride and groom prepare for their wedding day, they may purchase a membership to the system for each one of the people in their wedding party and for their close family members as a bridal gift. They could ask their loved ones to enter their thoughts, messages, and prayers for the newlywed couple that will be locked away in the time capsule system until their delivery date, such as several future anniversaries of their wedding, such as their first, fifth, tenth and twenty-fifth wedding anniversaries. An example of storing such a time capsule message for a friend is shown on FIG. 10. Similarly, when a baby is born or when a young adult graduates high school, the parents may provide gift memberships to close family and friends and ask them to put their messages for the newborn or graduate into the time capsule system for future events in the person's life. Accordingly, the system may not only be made available by hospital systems, it may also be made available to individuals through schools, places of worship, and event planners.

The ability to purchase family, corporate, or other entity memberships is currently not an option for existing messaging systems and is at least one of the novel features of the present invention. In a hospital or hospice setting, patients are very frequently bed-ridden and without access to the internet. The messaging system disclosed herein may be provided on a tablet computer or other mobile device and made accessible to the user or persons who are helping the user put their affairs in order. For example, using the mobile device, individuals who are concerned that their death may be imminent may work with a family member, friend, nurse or other hospital staff member to prepare their posthumous message. As another example, an account may be provided by life insurance companies at the time that insurance is purchased. Additionally, entities that require potentially dangerous work, such as the military, fire departments, and police departments, may provide access to the messaging system as a part of their benefits package.

In one embodiment, the system provides a separate user page for each user accessing the entity or group account. Through the user page, the user may prepare messages for recipients entered into the user page. Additionally, an administrator page may be provided to monitor each account. Through the administrator page, a staff member within the group or entity may authorize the release of messages from any user page.

In one embodiment, membership cards may be provided. The membership cards may be purchased for oneself and/or as a gift. When presenting a membership as a gift, the membership card may be physically presented. The card may include information for logging onto the system and starting an account.

As with previous posthumous messaging systems, the present system requires a trustee to authorize the release of a decedent's messages and ensure the delivery of the messages that are stored within the system. However, prior posthumous messaging systems did not consider the possibility that the user may want a broader distribution of some messages than the messages directed to particular individuals and that are sent directly to the recipients using their e-mail address. For example, some users of the system may want to place some messages on their social media sites or they may want their trustees to take this action after they have passed. As discussed in detail below, the present invention provides interfaces with social media systems and e-commerce systems so that a person may be able to coordinate messages through many of their various communication systems. Since the present system provides an interface between the host time capsule messaging system and other communications systems, particularly including social media services, the present invention allows the trustee to automatically send out messages to the deceased user's social media groups through the interface.

Even if users of prior known posthumous messaging systems had wanted to post onto their social media services one or more of the messages that they had created on the posthumous messaging system (before they have passed) or had provided instructions for their trustees to send out certain messages through the decedent user's social media accounts, there was nothing in the known systems that would allow the users to automatically launch their own social media accounts or for the trustees to automatically launch the decedent user's social media accounts using the messaging systems. Instead, the users and trustees would have to manually launch and log into each one of the social media sites using the user's social media account information and copy the messages into a social media's messaging application. In comparison, with the linkage between the present system and social media services and other systems according to the present invention, the messages can be automatically populated into the social media's messaging application and sent out by either the user when alive or the trustee when the user has passed. Therefore, the linkage between the host messaging system of the present invention and social media systems provides unexpected advantages that had not previously been considered in any of the known posthumous messaging systems.

Figure 4:
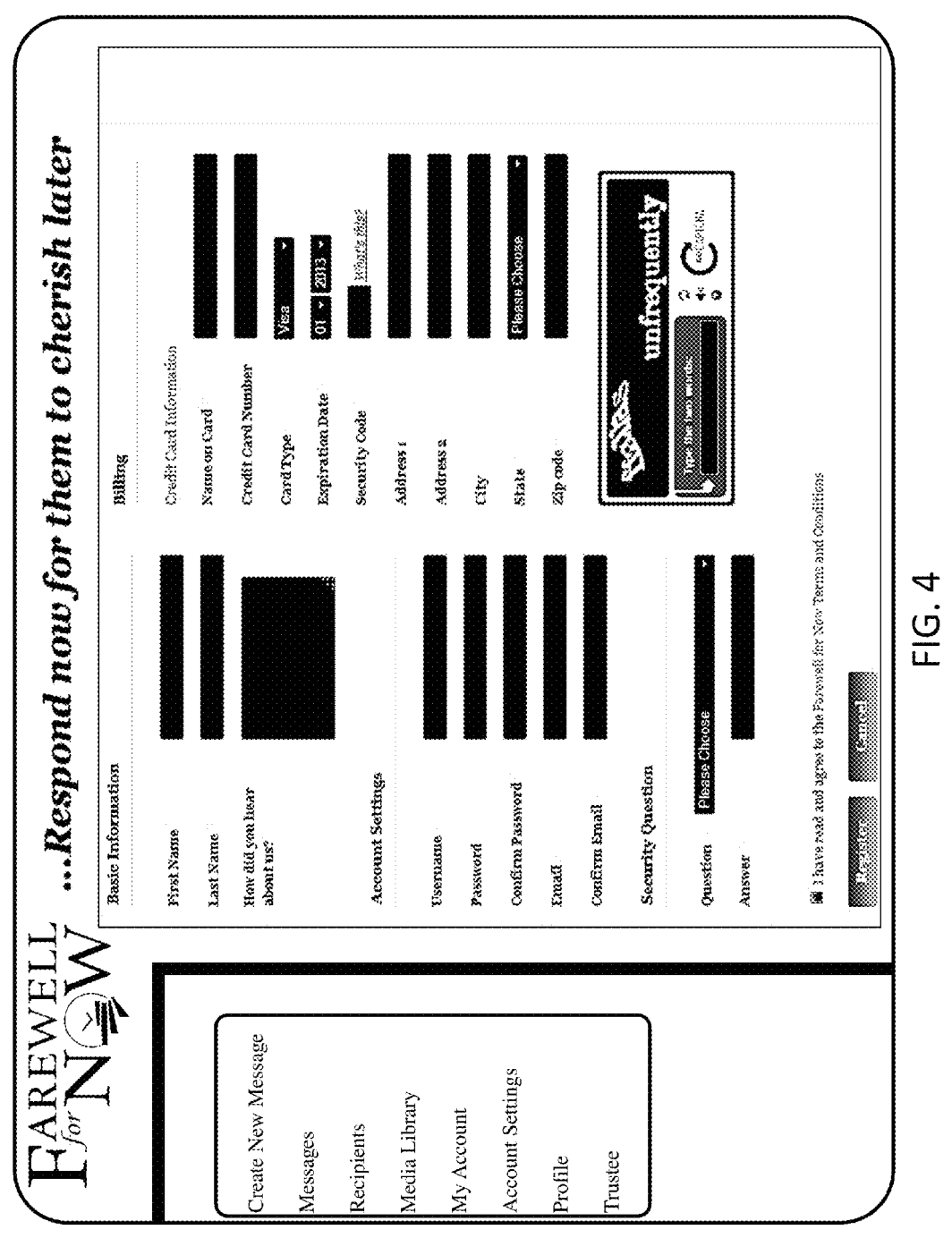
Figure 5:
FIG. 5 is a screenshot of an account summary webpage.
Figure 7:
FIG. 7 is a selection of a screenshot from an affirming inspirations webpage.

As shown in FIG. 4, the host time capsule messaging system includes a registration page where new users can register for the service. The user provides profile information, trustee information, and unique account information which can include billing information. The user also provides recipient information. With the interface linkage between the inventive system and the user's e-mail application and social media services to which the user has accounts, the user can grant the inventive system permission to query the user's accounts in these social media services to obtain the user's contacts and automatically populate these contacts in the host system as potential recipients. Once the user information is entered into the system, users can review and edit their account information as shown in FIG. 5.

After purchasing an account, the user profile webpage is provided. The user profile webpage requests that the user provide identifying information, as well as, contact information. The identifying information may be used in the future to identify the source of a message when the user is deceased. The contact information enables the system administrator to contact the user if questions or concerns regarding the user's account arise. The user profile webpage is capable of being updating at anytime by logging onto the messaging system.

Once the user profile is entered, the user is requested to provide the name and contact information for a designated trustee. The designated trustee is the only person capable of authorizing the release of the user's messages. Many current messaging systems enable any individual to contact the messaging provider with notice of the user's death. Other systems release the user messages after a set time period wherein the user does not log onto the website. Each of these methods may result in either inadvertent release of the messages and/or failure to release the messages all together. By using a designated trustee, the present system ensures that the messages will be released and at the appropriate time.

The trustee is provided with a unique authorization code that is required to release the user's messages. The trustee may be any individual trusted by the user, i.e. a family member. Alternatively, the user may appoint their attorney or other legal representative to act as trustee. In an entity setting, the entity may be named as the trustee. For example, if a life insurance company is named as the trustee, the life insurance company will have authorization to release the messages at the time that they are contacted regarded to life insurance policy after the user's death. As another example, hospitals or the military may have authorization to release the messages at the time of the user's death. The trustee may be changed at any time by logging onto the system. Additionally, multiple trustees may be named with one named as the primary trustee and the other named as a secondary trustee. In the event that the primary trustee is unavailable, for example, has predeceased the user, the secondary trustee may authorize the release of the messages.

Upon the user's death, the trustee enters the authorization code to authorize the release of the messages and media. The messages and media are then delivered to the recipients at a third party computer or mobile device through the internet or intranet. The messages may be delivered as emails. Alternatively, the messages may be sent to the linked social media systems on which the user has accounts, such as Facebook, Twitter, LinkedIn, Google+ and any other linked social media service. In one embodiment, the messages may be delivered as text messages. Optionally, audio recordings may be sent to a recipient's voice mail. In yet another embodiment, the recipient may be directed to a webpage where media and messages are posted.

A recipient entry webpage enables the user to add recipients for future messaging. The recipient entry webpage may be updated at any time to add or delete recipients. Additionally, recipient contact information may also be updated. The recipients that have been entered are listed on a separate recipient page. The user may consult this page in determining who to prepare a message for. A recipient is selected from this page and the user is given the option to create a message for this individual. In one embodiment, multiple recipients may be selected for creating a group message. As indicated above, some messages may be intended to be delivered through a message on the user's social media account(s) so that there is a broad distribution to all of the user's contacts within their social media circles as the recipients.

Preparing messages may be done in one of two fashions. First, the user may create the message using a freeform text box that provides no guidance to the user. As another option, the user may create a message based on inspirations which are catalyst statements or other suggestions for preparing the message that are provided by the system. Generally, people prefer to have a catalyst for initiating a message. The inspirations and other suggestions are provided in categories on a category webpage. Some examples of inspiration categories may include "children messages", "encouragement", "military" or the like. The categories of inspirations and a partial listing of inspirations are shown in FIGS. 6A and 6B, respectively.

The inspirations and categories can change over time, but once a message uses one of the inspirations and it is stored as an unsent message under the user's profile, the user's message will not change even though the inspiration on which it was based may change at some future date. Each category provides various inspirations and suggestions for beginning a message. Some examples include "if life has taught me anything . . . ", "you were right about . . . ", "my favorite place in our home was . . . " Additionally, when the user places a cursor over the inspiration, the system can automatically display a commentary or "progenitor" that may encourage, question, or verify that the user could or should use that particular inspiration. In the preferred embodiment, the commentary is a popup text block, and other options may include a hyperlink to a related webpage, a gadget or widget. A popup text block commentary is shown on FIG. 7 in conjunction with the cursor moving over the "You were a good man . . . " inspiration ("He'll be so thankful you said this") along with additional commentary examples.

The inspirations, catalysts or other suggestions are intended to make the user reflect on their lives and the recipient of the message. By providing suggestions in several selectable categories, the user may find it easier to prepare an appropriate message. Additionally, the categorized suggestions may be beneficial to individuals who lack the ability to recall much of their life or the people in their life. Often, individuals who are sick and/or dying are incapable of reflecting on their life without the help of another. The suggestions are provided to spark memories and thoughts. In a hospital setting, a user may work with a staff member using the suggestions to recollect the past to aid in creating messages. In one embodiment, suggestions may be automatically populated and emailed to the user, tweeted, or posted on linked social networking systems. These suggestions may be delivered by an administrator of the system to spark a user's interest in creating a message. Alternatively, the suggestions may be sent by other users who believe that the suggestion may be helpful to an individual.

In the preferred embodiment, there is a link between the selectable applications and the selectable inspirations. The computer processor in the host system runs scripts which can automatically produce an electronic document with an initial block of text that prompts the user to complete their thoughts. Depending on the user's optional selection of the message-type corresponding with the message suggestions, the scripts may bring the user to a word processing section of the system in which the initial block of text is pre-populated and the user can complete the message within the system, or the scripted instructions may launch another program, such as the user's e-mail program or a social media site.

Figure 8A:
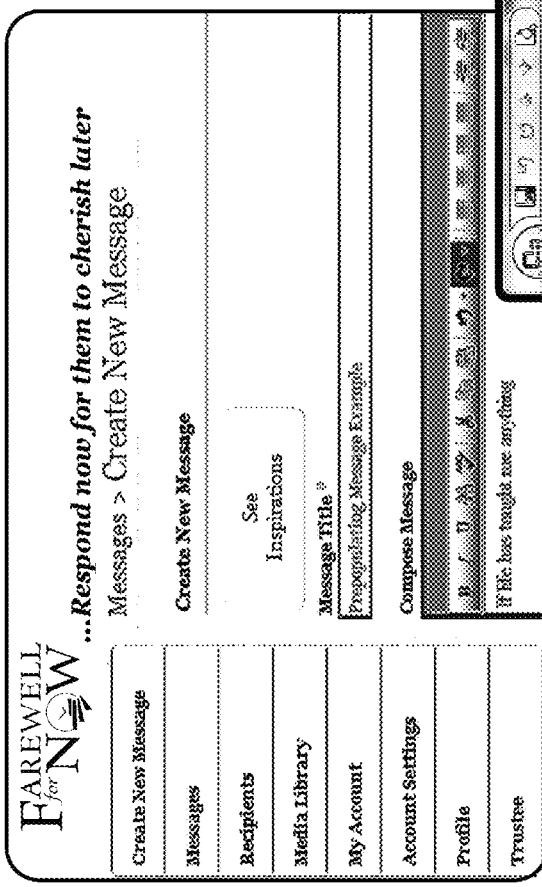
FIGS. 8A, 8B & 8C are screenshots of messages created by the inventive system within the word processing application within the system, in a networked social media system, and in a user's networked e-mail program, respectively.
Figure 8C:
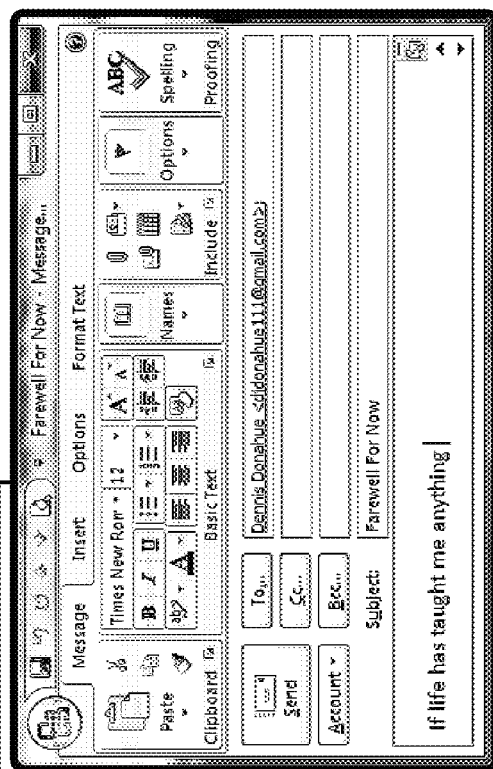
Figure 8B:
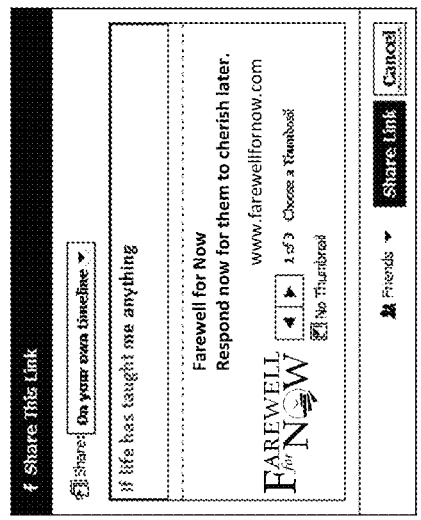

The system can alternatively pre-populate the message body in the e-mail program or the social media site with the text that corresponds with the message suggestion. For example, the selected inspiration in FIG. 7 ("If life has taught me anything") can be populated into the word processing application within the system as shown in FIG. 8A when the word processing option is selected. Similarly, the selected inspiration can be populated into a networked social media system or the user's networked e-mail program as respectively shown in FIGS. 8B and 8C depending on the respective selection of the social media option and the e-mail program option.

Figure 9:
FIG. 9 is a screenshot of a greeting card webpage with alternative e-cards.

It is also possible for the system to have links to a selection of completed messages, electronic greeting cards or other audio-visual communications that correspond to an inspiration category and which have prepared messages that the user could use in whole or modify for a unique statement. For example, when a greeting card application is selected, the system can execute scripts which automatically launch the greeting card website in a browser window, and the selection of the inspiration can be linked to a particular card available on the greeting card website. As shown in FIG. 9, there may be different cards in the greeting card website that may fit with an inspirational message. However, the particular tone of the inspirational message will likely be known based on the category from which the inspiration has been selected. For example the selection of the "If life has taught me anything" inspiration under the Edgy/Irreverent or Funny/Lighthearted categories could automatically be linked to the top card in FIG. 9 whereas the selection of the "If life has taught me anything" inspiration from the Affirming, Inspiring/Religious or Proclamation/Life's Statement categories could automatically be linked to the bottom card in FIG. 9.

Accordingly, the selection of one of the message suggestions causes the system's computer processor to run scripted instructions which may take one of a number of actions, such as launching the word processing portion of the system, launching a user's local messaging application or connecting the user's web browser to a networked website, and the script either pre-populates a portion of a message using information that is stored within the system itself or otherwise identifies a preexisting message that can be incorporated into the user's message.

Each message is stored on a message webpage. The messages may be edited or deleted at any time. Once the message has been drafted and saved, an anonymous email is sent to the recipient notifying them that someone has sent them a message. This initial email is a teaser email until the actual message itself is sent. The delivery time of any given message may be dictated by the user. As a default, messages are sent after the user's death when the trustee enters the authorization code. As another option, a user who feels that time is of the essence may log into the system and choose messages to be sent at that moment using a "send it now" feature.

As another unique feature if the present invention, messages may be sent to mark particular milestones. For example, if a user is concerned about passing before a loved one's graduation, a message may be prepared for delivery on the graduation day. As another example, a user may prepare a message to be sent to their spouse every year on their spouse's birthday or on their wedding anniversary. The system could also include a monetary deposit that could be used to purchase flowers or some other gift for the spouse on the anniversary and provide a corresponding card with the message that has been selected for the anniversary.

The user also has the option to upload various forms of media, ranging from video, to audio, to photos and the like. At the time of the user's death the media may be delivered to intended recipients. Optionally, the recipients may be directed to a webpage where the media is stored. The media may be sent exclusively to specific recipients or the media may be sent to all recipients or groups of recipients.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, as explained in the preceding paragraphs, the time capsule aspects of the present invention could be used to collect and preserve messages for a person when they reach a particular milestone even when the people creating the message are still alive, such as a time capsule of messages that a family may create when a child is born into the family and the messages are delivered to the child on a certain event (such as a first communion) or reach a certain age. Thus, the breadth and scope of the present invention should not be limited by any of the above-described exemplary embodiments, but should be defined only in accordance with the following claims appended hereto and their equivalents.

What is claimed is:

1. A posthumous messaging method for preparing and saving messages in a host computer system as time capsule computer files for delayed action, comprising the steps of:
    maintaining in the host computer system an electronic database of user accounts, inspiration options, text segments, intended recipients, and unsent messages, wherein said electronic database is accessible through a computer network, wherein said user accounts comprise user profiles and said unsent messages are respectively associated in said electronic database to said intended recipients according to said user profiles, and wherein said inspiration options are respectively associated in said electronic database to said text segments;
    providing in the host computer system a computer processor for executing a word processing application and a plurality of scripts, wherein said scripts are comprised of predefined code with at least one variable entry, and wherein said electronic database stores a plurality of variable entry options respectively corresponding with said inspiration options;
    receiving a message initiation instruction at said computer processor through said computer network from an authorized user associated with one of said user accounts;
    providing said inspiration options to said authorized user through said computer network in response to said received instruction, wherein said inspiration options are comprised of unique inspiration descriptions and respectively corresponding inspiration identifiers;
    receiving at said computer processor from said authorized user a selection of at least one of said inspiration identifiers for a corresponding one of said inspiration options;
    dynamically populating said variable entry in said scripts with a unique variable entry from said variable entry options, wherein said unique variable entry respectively corresponds to said one of said inspiration options according to said selected inspiration identifier;
    executing said dynamically populated scripts in said computer processor, wherein said executed scripts automatically select one of said text segments corresponding with said selected inspiration identifier and wherein said executed scripts automatically populate a message in said word processing application with said selected text segment;
    receiving at said computer processor from said authorized user a recipient set-up instruction, wherein said recipient set-up instruction includes a recipient notification option of an anonymous system notification, a user-identified notification and an opt-out notification; and
    executing in said computer processor a notification message application in which each recipient identified in a new unsent message is evaluated for a notification message, wherein said notification message reports that some other message has been created for said recipient within the host computer system without identification of said authorized user when said anonymous system notification is selected for said recipient and with identification of said authorized user when said user-identified notification is selected for said recipient, and wherein no notification message is sent when said opt-out notification is selected for said recipient.

2. The method of claim 1, further comprising the steps of:
    storing in said electronic database a plurality of application options, wherein said application options are comprised of an internal application option and a networked application option,
    providing said application options to said authorized user in combination with said inspiration options;
    receiving an application selection from said authorized user in combination with said selected inspiration identifier;
    executing said dynamically populated scripts in said computer processor according to said application selection and said selected inspiration identifier.

3. The method of claim 2, wherein said internal application option corresponds with said word processing application and wherein said networked application option is comprised of an external system application option and a user local computer application option.

4. The method of claim 3, wherein said internal application option further comprises a group photo album application option, an audio recording application option and an audio/video recording application option, wherein said external system application option is further comprised of a social media platform option, an electronic greeting card option and an e-commerce option, and wherein said user local computer application option is further comprised of an e-mail application option, a local photo album application option and a local audio/visual editing application.

5. The method of claim 2, further comprising the steps of:
    providing a web browser interface for a user local computer to access the host computer system through a web browser connected to said computer network;
    linking said inspiration options to corresponding electronic greeting cards using a greeting card set of variable option entries stored in said electronic database, wherein said electronic greeting cards are available through a networked greeting card application and wherein said greeting set of variable option entries are a plurality of greeting card identifiers;

receiving an electronic greeting card application selection as said application selection from said authorized user in combination with said selected inspiration identifier; and executing said dynamically populated scripts in said computer processor according to said electronic greeting card application selection and said selected inspiration identifier, wherein said execution step further comprises the steps of:

sending an instruction to said user local computer to automatically launch said electronic greeting card application through a web browser window in said web browser; and sending a greeting card identifier corresponding to said inspiration identifier to said user local computer to have said electronic greeting card application automatically select and display at least one electronic greeting card through said web browser window.

6. The method of claim 2, further comprising the steps of:
providing a web browser interface for a user local computer to access the host computer system through a web browser connected to said computer network; receiving a social media application selection as said application selection from said authorized user in combination with said selected inspiration identifier; and executing said dynamically populated scripts in said computer processor according to said social media application selection and said selected inspiration identifier, wherein said execution step further comprises the steps of:

sending an instruction to said user local computer to automatically launch said social media application through a web browser window in said web browser; and sending said selected text segment to automatically populate a messaging section of said social media application in said web browser window.

7. The method of claim 2, further comprising the steps of:
receiving a user local messaging application selection as said application selection from said authorized user in combination with said selected inspiration identifier; and executing said dynamically populated scripts in said computer processor according to said user local messaging application selection and said selected inspiration identifier, wherein said execution step further comprises the steps of:

sending an instruction to said user local computer to automatically launch said user local messaging application; and sending said selected text segment to automatically populate a message in said user local messaging application with said selected text segment.

8. The method of claim 2, further comprising the steps of:
providing a web browser interface for a user local computer to access the host computer system through a web browser connected to said computer network;

storing in said electronic database a plurality of inspiration commentaries respectively corresponding with said inspiration options;

receiving at said computer processor from said web browser a cursor location on a web browser page, wherein said cursor location identifies one of said inspiration options according to a display location on said web page;

sending an instruction said web browser to display one of said inspiration commentaries corresponding to said cursor-location identified inspiration options.

9. The method of claim 1, further comprising the steps of:
receiving at said computer processor from said authorized user a recipient instruction identifying at least one recipient for one of said unsent messages; and receiving a plurality of sending instructions, wherein said sending instructions are comprised of a timing selected from an immediate delivery, a predetermined delivery date in the future, and a posthumous delivery.

10. The method of claim 1, further comprising the steps of:
storing in said electronic database a plurality of trustees; and associating each one of said user accounts with at least one of said trustees.

11. The method of claim 1, further comprising the steps of:
storing in said electronic database at least one membership group; and associating a plurality of user accounts to said membership group.

12. A posthumous messaging method for preparing and saving messages in a host computer system as time capsule computer files for delayed action, comprising the steps of:

maintaining in the host computer system an electronic database of user accounts, inspiration options, alphanumeric text blocks, application options, intended recipients, and unsent messages, wherein said electronic database is accessible through a computer network, wherein said user accounts comprise user profiles and said unsent messages are respectively associated in said electronic database to said intended recipients according to said user profiles, and wherein said inspiration options are respectively associated in said electronic database to said text segments;

providing in the host computer system a computer processor for executing a centralized application and a plurality of scripts, wherein said scripts are comprised of predefined code with a plurality of variable entries, wherein said electronic database stores a first set of variable entry options respectively corresponding with said inspiration options, and wherein said electronic database stores a second set of variable entry options respectively corresponding with said application options;

receiving a message initiation instruction at said computer processor through said computer network from an authorized user associated with one of said user accounts;

providing said inspiration options and said application options to said authorized user through said computer network in response to said received instruction, wherein said inspiration options are comprised of unique inspiration descriptions and respectively corresponding inspiration identifiers, and wherein said application options are comprised of an internal application option and a networked application option;

receiving at said computer processor from said authorized user an inspiration selection and an application selection, wherein said inspiration selection is comprised of at least one of said inspiration identifiers for a corresponding one of said inspiration options, wherein said application selection is comprised of at least one of said internal application option and said networked application option;

dynamically populating a first one of said variable entries in said scripts with an inspiration variable entry from said first set of variable entry options, wherein said inspiration variable entry respectively corresponds to said one of said inspiration options according to said selected inspiration identifier;

dynamically populating a second one of said variable entries in said scripts with an application variable entry from said second set of variable entry options, wherein said application variable entry respectively corresponds to one of said internal application option and said networked application option;

executing said dynamically populated scripts in said computer processor, wherein said executed scripts select one of said applications and select one of said alpha-numeric text blocks, wherein said selected alpha-numeric text block corresponds with said selected inspiration identifier and wherein said executed scripts automatically populate said selected alpha-numeric text block into an application instruction which uniquely identifies a message in said selected application;

receiving at said computer processor from said authorized user a recipient set-up instruction, wherein said recipient set-up instruction includes a recipient notification option of an anonymous system notification, a user-identified notification and an opt-out notification; and executing in said computer processor a notification message application in which each recipient identified in a new unsent message is evaluated for a notification message, wherein said notification message reports that some other message has been created for said recipient within the host computer system without identification of said authorized user when said anonymous system notification is selected for said recipient and with identification of said authorized user when said user-identified notification is selected for said recipient, and wherein no notification message is sent when said opt-out notification is selected for said recipient.

13. The method of claim 12, wherein said centralized application is comprised of operation calls to a networked application, wherein said networked application is a social media application and wherein said alpha-numeric text blocks are populated into a message within said social media application.

14. The method of claim 12, wherein said centralized application is comprised of a word processing application, wherein said alpha-numeric text blocks are text segments, and wherein said executed scripts automatically select one of said text segments corresponding with said selected inspiration identifier and wherein said executed scripts automatically populate a message in said word processing application with said selected text segment.

15. The method of claim 12, wherein said centralized application is comprised of operation calls to a networked application, wherein said networked application is an electronic greeting card application, wherein said alpha-numeric text blocks are hypertext link segments, and wherein said executed scripts automatically select one of said hypertext link segments corresponding with said selected inspiration identifier and wherein said executed scripts automatically select an electronic greeting card through said hypertext link segments populated in said electronic greeting card application.

16. The method of claim 12, wherein said internal application option corresponds with a word processing application and wherein said networked application option is comprised of an external system application option and a user local computer application option.

17. The method of claim 16, wherein said internal application option further comprises a group photo album application option, an audio recording application option and an audio/video recording application option, wherein said external system application option is further comprised of a social media platform option, an electronic greeting card option and an e-commerce option, and wherein said user local computer application option is further comprised of an e-mail application option, a local photo album application option and a local audio/visual editing application.

18. An improved posthumous messaging method wherein a host computer system has a processor in operative communication with a database and in networked communication with a plurality of remote computer systems and has an internal messaging system application, wherein the database stores a plurality of inspiration options, a plurality of application options, a plurality of user profiles, a plurality of intended recipients, and a plurality of unsent messages, wherein the unsent messages are respectively associated to said intended recipients according to a said user profiles, wherein the improvement comprises the steps:

selecting an inspiration defined by said inspiration options;

selecting an application defined by said application options, wherein said application options are comprised of an internal word processing application and at least one of a networked social media application, a networked electronic greeting card application, and a networked e-mail application;

executing scripts in the processor of the host computer system according to said selected inspiration and said selected application, wherein said scripts automatically launch said selected application and wherein said scripts automatically enter a unique alpha-numeric text block into said selected application according to said selected inspiration, wherein a message segment uniquely corresponding with said selected inspiration is automatically entered into a text editing window in said internal word processing application as said selected application, wherein a text segment uniquely corresponding with said selected inspiration is automatically populated into a messaging section of said networked social media application as said selected application, wherein a greeting card identifier uniquely corresponding with said selected inspiration is automatically populated into a greeting card selection function in said networked electronic greeting card application as said selected application, wherein said networked electronic greeting card application provides an electronic greeting card corresponding with said greeting card identifier, and wherein a message segment uniquely corresponding with said selected inspiration is automatically entered into an e-mail message in said networked e-mail application as said selected application;

receiving at said processor from an authorized user a recipient set-up instruction, wherein said recipient set-up instruction includes a recipient notification option of an anonymous system notification, a user-identified notification and an opt-out notification; and executing in said processor a notification message application in which each recipient identified in a new unsent message is evaluated for a notification message, wherein said notification message reports that some other message has been created for said recipient within the host computer system without identification of said authorized user when said anonymous system notification is selected for said recipient and with identification of said authorized user when said user-identified notification is selected for said recipient, and wherein no notification message is sent when said opt-out notification is selected for said recipient.

19. The method of claim 18, further comprising the steps of: sending one of the unsent messages to a corresponding one of the intended recipients through the internal messaging system, wherein the message being sent is at least one of a message created in said internal word processing application and said electronic greeting card provided by said networked electronic greeting card application; and sending another one of the unsent messages to a group of intended recipients through at least one of said networked social media application and said networked e-mail application.

* * * * *